Jan. 7, 1936.　　　　　M. LEVY　　　　　2,027,049
WHEELED TOY
Filed May 18, 1935
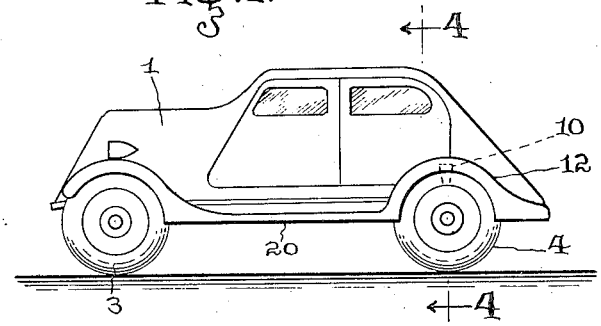
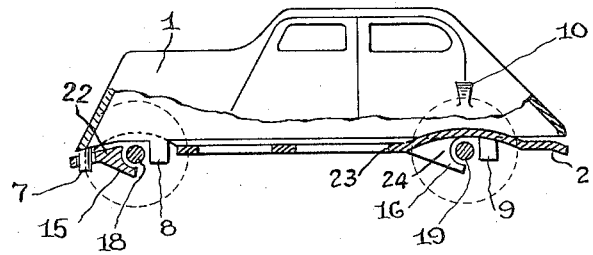
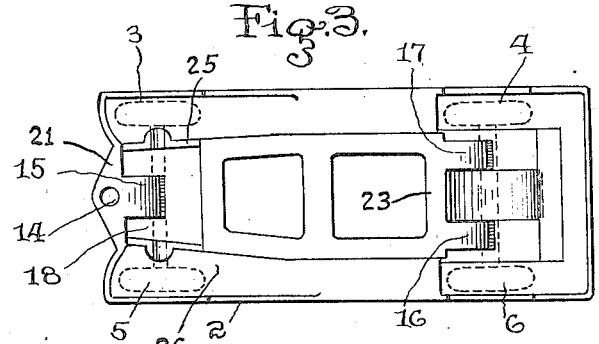
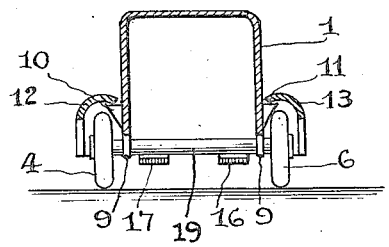
INVENTOR
Michael Levy
BY
ATTORNEY Patented Jan. 7, 1936

2,027,049

UNITED STATES PATENT OFFICE 2,027,049

WHEELED TOY

Michael Levy, Brooklyn, N. Y.

Application May 18, 1935, Serial No. 22,135

5 Claims. (Cl. 46—201)

My invention relates to improvements in wheeled toys.

An object of my invention is to provide a new and useful toy. A further object of the invention is to provide means for locking together the parts of a wheeled toy. A further object of my invention is to provide means for attaching the axle and traction wheels to a wheeled toy.

A further object of my invention is to provide means for attaching the body of a wheeled toy to its chassis.

A preferred embodiment of my invention is illustrated in the accompanying drawing, in which Figure 1 is a side elevation of a wheeled toy, Figure 2 is a like view with the lower part of the device shown in section, Figure 3 is a view of the underside of the chassis of the toy, with the wheels and axles shown in dotted lines, and Figure 4 is a section on the line 4—4 in Figure 1.

Similar reference numerals refer to similar parts throughout the several views.

The wheeled toy illustrated in the drawing is in the form of an automobile and comprises a body 1 and a chassis 2 with traction wheels 3, 4, 5 and 6.

At the forward end of the body 1 there is provided a downwardly extending lug or pin 7 adapted to be seated in a socket 14 formed in the front marginal edge of the chassis and may be riveted therein. On the side walls of the body 1 at the rear portion thereof there are provided outwardly extending lugs 10 and 11 which engage the underside of the mud guards 12 and 13 respectively carried by the chassis 2 whereby the body and chassis are securely bound or locked together.

The chassis 2 may be provided with marginal representations of mud guards 12, 13, running boards 20 and the like, and the body portion 1 may be shaped and decorated to present the appearance of doors, windows, head lights and the like as may be desired.

The chassis portion 2 is preferably of skeleton form and is provided at its forward end with a cross-bar 21, having a rearwardly and downwardly projecting leaf 15, provided with a shoulder 22, forming an open seat for the front axle 18. The rear portion of the chassis is provided with a cross-bar 23 having two counterpart rearwardly and downwardly projecting leaves 16 and 17 with shoulders 24 forming seats for the rear axle 19, the said leaves 15, 16 and 17 being of similar form.

The body portion 1 of the toy is provided, on its lower marginal edge, with downwardly projecting lugs 8 and 9 so positioned that when the body and chassis are assembled, the said lugs will lie rearwardly of the axles 18 and 19 respectively and between the side bars 25 and 26 of the chassis 2 and thus form rear stops for the said axles and retain them in their respective seats. As the side of the body 1 toward the reader is cut away in the sectional view thereof in Figure 2, only one of the said lugs 8 is shown but I prefer to provide the lugs 8 at each side of the body 1 rearwardly of the axle 18.

The parts are assembled by seating the axle 18 in the open seat on the leaf 15, and seating the axle 19 in the seats formed by the leaves 16 and 17, and then placing the body portion 1 on the chassis 2 so that the lugs 8 and 9 will lie rearwardly of the said axles 18 and 19 respectively, and close the said axle seats. The pin 7 will enter its seat 14 and the looped mud guards 12 and 13 are pressed over their engaging lugs 10 and 11 respectively thereby locking the body 1 on the chassis 2 with the axles 18 and 19 in their respective seats.

Having thus described my invention, what I claim is:

1. In a device of the character described, the combination of a body section and a chassis section, a pin on one of the said sections and a seat for the said pin in the other of the said sections, lugs carried by one of the said sections and means on the other of the said sections positioned to engage the said lugs, traction wheels for the said device, axles for the said traction wheels, and means for attaching the said axles to said device comprising a plurality of leaves extending below the chassis and forming open seats for the said axles, and lugs on the body section positioned to close the said seats and to hold the axles therein.

2. In a device of the character described, the combination of a body and a chassis, lugs positioned on the said body adjacent one end thereof, looped sections on the chassis positioned to engage the said lugs, and a pin and socket therefor adjacent the other end of said body and chassis whereby the body and chassis are secured together.

3. In a device of the character described, the combination of a body section and a chassis section, a cross-bar at the forward portion of the chassis section, a leaf on the said cross-bar and extending downwardly and rearwardly therefrom, and a shoulder on the said leaf forming an open seat for an axle, an axle in the said seat and a downwardly projecting lug on the body section positioned adjacent to the said seat and adapted to retain the said axle therein.

4. In a device of the character described, the combination of a body section, a chassis section and an axle provided with traction wheels, a leaf on the said chassis section and a shoulder on the said leaf forming a seat for the said axle, and a member carried by the body section and positioned to close the said seat and retain the said axle therein when the body section and chassis section are assembled.

5. In a device of the character described, the combination of a body section and a chassis section, traction wheels and an axle for said traction wheels, a leaf extending downwardly from the chassis section and a shoulder on the said leaf forming a seat for the said axle, a member carried by the body section and positioned to retain the said axle in the said seat, and means for attaching the said body section to the said chassis section comprising a pin and socket at one end portion of the device and lugs and engaging means for said lugs at the other end portion thereof.

MICHAEL LEVY.